United States Patent [19]
Cecchi et al.

[11] Patent Number: 4,986,663
[45] Date of Patent: Jan. 22, 1991

[54] METHOD AND APPARATUS FOR DETERMINING THE POSITION OF A MOBILE BODY

[75] Inventors: Stefano Cecchi, Prato; Francesco Simonelli, Florence, both of Italy

[73] Assignee: Societa' Cavi Pirelli S.p.A., Milan, Italy

[21] Appl. No.: 453,663

[22] Filed: Dec. 20, 1989

[30] Foreign Application Priority Data

Dec. 21, 1988 [IT] Italy .............................. 23039 A/88

[51] Int. Cl.$^5$ ............................................ G01B 11/00
[52] U.S. Cl. .................................... 356/375; 356/373
[58] Field of Search ...................... 356/121, 373, 375; 250/561

[56] References Cited

U.S. PATENT DOCUMENTS 4,856,902 8/1989 Wiedemann ......................... 356/375

Primary Examiner—F. L. Evans
Attorney, Agent, or Firm—Brooks Haidt Haffner & Delahunty

[57] ABSTRACT

A method and apparatus for determining the position of a mobile body which is movable along a rectilinear path relative to a fixed reference body in which the position of the mobile body is independent of any spurious movements of the body or variations in the intensity of the source of radiation.

In the preferred embodiment of the apparatus, an optical sensor includes a source of optical radiation integral with the mobile body and the intensity of which varies continuously in the direction of movement of the mobile body, two optical receivers integral with the fixed reference body and side-by-side in the direction of movement of the mobile body and directly facing the source of optical radiation without any interposed device, the optical receivers always being fully illuminated by the source of optical radiation, photoelectric diodes to transform the optical signals falling on the optical receivers into electrical signals of corresponding intensity, a subtractor and an adder to provide signals corresponding to the difference and the sum of the electric signals, a divider to provide a signal corresponding to the ratio between the difference and the sum of the signals and a comparator to compare the ratio signal with the contents of a memory in which the correspondence between the ratio signal and the position of the mobile body is stored.

14 Claims, 2 Drawing Sheets

FIG. 1.

METHOD AND APPARATUS FOR DETERMINING THE POSITION OF A MOBILE BODY

BACKGROUND OF THE INVENTION

The present invention relates to the field of optical position sensors and particularly to a method and an optical sensor for determining the position of a mobile body moving in a rectilinear direction and transversely with respect to a fixed reference body.

Optical sensors of this type, such as, for example, those described in the British Patent No. 956 347, are already known. These include, in particular, optical sensors comprising, mainly, three components, i.e. a radiation source integral with the fixed reference, optical detectors facing the radiation source and integral with the fixed reference, and an encoded plate integral with the mobile body, the plate being interposed and moving in the space between the source and the detectors.

The encoded plate is formed of a support transparent to light on which opaque areas, which prevent the passage of light according to a code representing the position of the mobile body, are present.

When the position of the mobile body changes, the position of the plate changes, and consequently, the intensity of the radiation received by the light receivers also changes.

Therefore, the measurement of the intensity of the radiation received by the light receivers represents the position of the mobile body.

Such known optical sensors, however, have certain disadvantages. Primarily, the encoded plate is fragile and consequently, it is easily damaged. Secondly, if the plate is subjected to spurious movements such as falling below, rising above or misalignments with respect to the mobile body, variations occur in the intensity of the radiation received by the light receivers which are not due to a variation in the position of the mobile body, and consequently, measurement of the position of the mobile body is made unreliable by such spurious movements.

Furthermore, if the light source has spurious variations in intensity, the intensity of the radiation received by the receivers also varies, even when the position of the mobile body has not changed. Also, in this case, an incorrect measurement of the position of the mobile body is obtained.

To avoid this second disadvantage, in a known solution described in the British Patent No. 2 054 135, the plate is encoded in such a way that when the plate moves and even though the intensity of the individual radiation signals received by each light receiver varies, the use of the radiation intensities received by all the receivers is independent of the position of the plate and depends only on the intensity of the radiation emitted by the source.

The intensities of the radiation received by the receivers are transformed into electrical signals, and the sum of these electrical signals (not dependent on the position of the mobile body) is compared with a fixed reference signal.

By means of a closed loop control circuit, the signal resulting from such comparison is amplified and sent to control the supply of the radiation source. In this way, if the sum of the electrical signals decreases, it means that the source is emitting a lower intensity of radiation or light than the pre-established value, and the control circuit increases the energy supply of the light source thereby causing the source to return to emitting the pre-established value of light.

In the same way, if the sum of the electric signals increases, it means that the source is emitting light at an intensity greater than that pre-established value, and the control circuit reduces the energy supply of the light source, bringing the source back to emitting light at an intensity equal to that which is pre-established.

Specifically, in said known optical sensor, it is not the determination of the position of the mobile body which is made independent of the spurious variations in the light intensity of the source, but said spurious variations are compensated by regulating the supply of the energy source in such a way that it emits light of a constant intensity.

However, in order to obtain this regulation, it was necessary to use a closed loop control circuit, and a light source energy supply which can be regulated. Both requirements cause said known position optical sensor to be high in cost and to have circuit complications.

SUMMARY OF THE INVENTION

The purpose of the present invention is to provide a method and an optical sensor for determining the position of a mobile body movable rectilinearly and transversely with respect to a fixed reference body in which the determination of the position is not influenced by spurious movements of an encoded plate with respect to the mobile body or by spurious variations in the radiation intensity of the source.

The method of the present invention for determining the position of a mobile body movable rectilinearly and transversely with respect to a fixed reference body is characterized by comprising the following steps:

associating with one of said bodies a source of optical radiation having an intensity which varies in a continuous way in the direction of movement of the mobile body;

associating with the other one of said bodies at least two optical receivers aligned side-by-side in the direction of movement of the mobile body;

facing the optical receivers directly towards the source of optical radiation, without any interposing device, so that they are always completely illuminated;

converting the intensity of light radiation detected by each optical receiver into electrical signals of corresponding intensity;

determining the ratio between a first and a second combination of the intensities of said electrical signals, such combinations being different one from the other;

comparing the value obtained from said ratio with a predetermined scale of reference values corresponding to the values of said ratio and the position of the mobile body.

In a preferred embodiment consisting of only two optical receivers, the first combination cf electrical signals is obtained from the difference between the electrical signals, while the second combination is obtained from the sum of the same electrical signals.

In a second preferred embodiment consisting of only two optical receivers, only one of the two electrical signals is compared with one of the other electrical signals.

The apparatus of the present invention comprises an optical sensor for determining the position of a mobile body movable rectilinearly and transversely with respect to a fixed reference body, characterized in that the sensor includes the combination of:

a source of optical radiation integral with one of the bodies and having an intensity which varies in a continuous way in the direction of movement of the mobile body;

at least two optical receivers integral with the other one of said bodies and aligned side-by-side in the direction of movement of the mobile body, said receivers facing directly towards the source of optical radiation, without any interposed device, and being completely illuminated by said source;

means for transforming the intensities of the optical radiation received by each optical receiver into electric signals of intensities corresponding to those of the optical radiation received;

means for providing a signal corresponding to the ratio between a first and a second combination of said intensities of electrical signals, such combinations being different one from another;

means for comparing the value of said ratio with a predetermined scale of ratio reference values corresponding to the position of the mobile body.

In one preferred solution, the source of optical radiation is a laser diode which provides radiation of an intensity which varies in the direction of movement of the mobile body according to a Gaussian curve.

In the preferred solution, the optical receivers include the free extremities of two optical fibers.

BRIEF DESCRIPTION OF THE DRAWINGS

Other objects and advantages of the present invention will be apparent from the following detailed description of the presently preferred embodiments thereof, which description should be considered in conjunction with the accompanying drawings in which.

DESCRIPTION OF PREFERRED EMBODIMENTS

The method for determining the position of a body movable rectilinearly transversely to a fixed reference which is the subject of this invention, is based essentially on the following steps:

associating with either a mobile body or a fixed reference body a source of optical radiation the profile of the intensity of which varies continuously in the direction of movement of the mobile body, such source being, for example, a diode laser the intensity of light radiation of which, in the direction of movement of the mobile body, varies according to a Gaussian curve;

associating with the other body at least two optical receivers aligned side-by-side in the direction of movement of the mobile body, such receivers including, for example, the free extremities of optical fibers;

facing the optical receivers directly towards the source of radiation, with no intermediate device, always keeping them fully illuminated with the radiation from the source;

transforming the intensity of optical radiation received by each optical receiver into electrical signals of an intensity corresponding to the intensity of the optical radiation received;

determining the ratio between a first and a second combination of said electrical signals, such combinations being different one from the other. By "combination" is meant the operation of multiplying every single intensity of electrical signals by any numerical coefficient and providing an algebraic sum of the result obtained. For example, in case of only two receivers and, therefore, only two intensities of electrical signal, the first combination can be the difference between the two signals whereas the second combination can be the sum of the same signals. On the other hand, the first combination can be only one of the two electrical signals and the second combination can be only the other one of the two electrical signals;

comparing the value of such ratio with a predetermined scale of reference values which correspond to the position of the mobile body.

Figure 1:
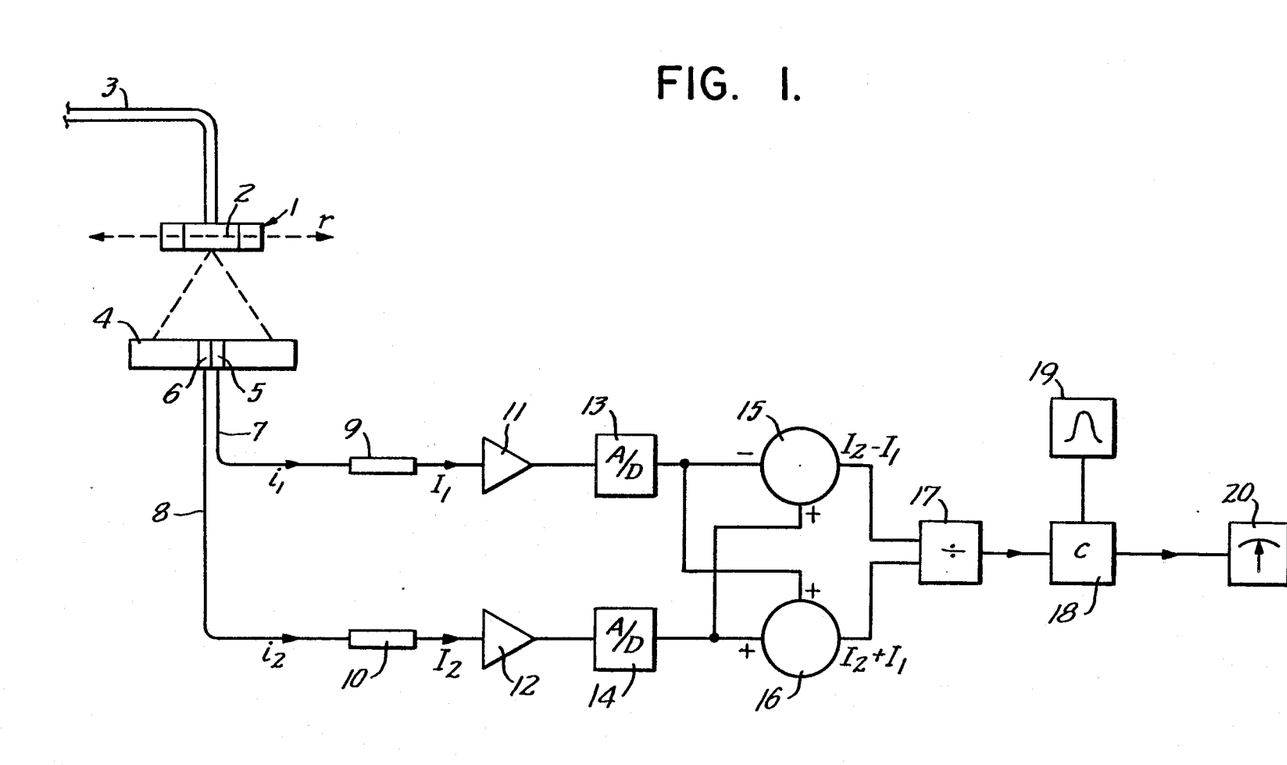
FIG. 1 is a schematic diagram of the optical sensor of the present invention.
Figure 2:
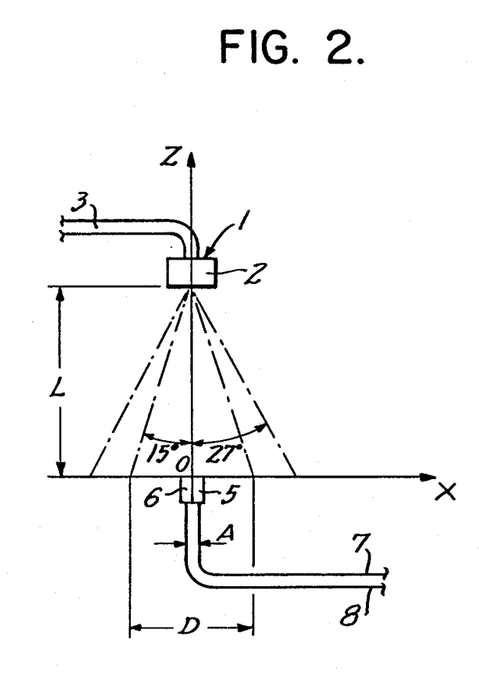
FIG. 2 is an enlargement of a portion of the apparatus shown in FIG. 1 with the source radiation diagrammatically indicated.
Figure 3:
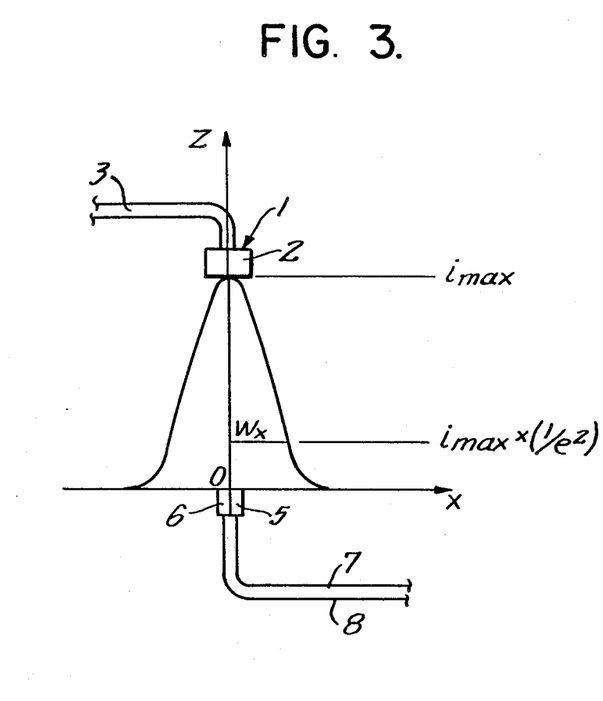
FIG. 3 is similar to FIG. 2.

With reference to FIGS. 1, 2 and 3, the reference numeral 1 indicates a mobile body movable in a rectilinear direction "r", the position of which body it is necessary to find, and to which is integrally connected a laser diode 2 which emits optical radiation in a direction perpendicular to that of the movement of the mobile body 1.

By "optical radiation" is meant radiation either within or outside of the visible spectrum.

The laser diode 2, supplied by electric wires 3 from an electrical source (not shown in the drawing) can be, for example, a type TOLD 131 diode sold by Toshiba Corp., which emits an optical radiation of wavelength $\lambda = 830$ nm.

The optical radiation coming from the laser diode 2 propagates itself in the direction of emission and widens out as a beam with various angles of divergence, i.e. of a non-circular cross-section. In particular, taking as reference system a set of Cartesian axes in which the z axis coincides with the axis of the laser beam and the x and the y axes define a plane perpendicular to the direction of propagation of the optical radiation, the origins of the x and y axes falling on the axis of laser beam, it can be said (see FIG. 2) that the laser beam widens out at the x-y plane with a maximum angle of divergence (indicated by the dashed line) of about 27 degrees, while the minimum angle of divergence of the laser beam at the x-y plane is about 10 degrees (not shown in FIG. 2).

The laser diode 2 is fixed on the mobile body 1 in such a way that the maximum angle of divergence coincides with the direction of movement of the mobile body, such direction being that of the x axis.

In addition to expanding in the way described immediately above, the laser beam presents a spatial distribution of its radiation intensity which follows a Gaussian curve. Specifically, in the chosen reference system, such intensity of optical radiation has the following distribution:

$$i = \frac{2P}{\pi W_x W_y} \cdot e^{-\frac{2x^2}{W_x^2}} \cdot e^{-\frac{2y^2}{W_y^2}}$$

where P is the total intensity of optical radiation emitted by laser diode 2 (which is 40 mW), and Wx and Wy are the half-widths of the Gaussian curve along the x axis and the y axis respectively when the intensity is reduced to $1/e^2$ of its maximum value of $$\frac{2P}{\pi W_x W_y},$$

which coincides with the central axis of the laser beam.

The values of Wx and Wy thus represent the shape of the particular choice of Gaussian curve. For the Toshiba TOLD 131 laser diode Wx is about 3.8 mm, while Wy, which is not shown in FIG. 3, is about 1.4 mm.

The description hereinafter sets forth the criteria which have led to this choice.

In particular, the intensity of optical radiation in the z-x plane (see FIG. 3) along the path of the moving body follows a curve defined by:

$$i = \frac{2P}{\pi W_x W_y} \cdot e^{-\frac{2x^2}{W_x^2}}$$

that is to say, it is a Gaussian distribution in which the intensity of light radiation depends only on the distance along the x axis which separates the point under consideration from the origin of the z and x axes.

Parallel with the mobile body 1 and at a distance "L" from it, measured along the direction of propagation of the optical receivers 5 and 6.

In the particular embodiment illustrated, said optical receivers consist of two cylindrical ferrules with central holes in which are inserted the free ends of two optical fibers 7 and 8, said extremities presenting plane faces perpendicular to the ferrules.

The two optical receivers are fixed together along a common generatrix, and are positioned in such a way that this common generatrix is aligned with the axis of the laser beam. Said receivers have their receiving plane surfaces facing the laser diode 2 which completely illuminates them, and they are placed side-by-side in such a way that a line joining the centers is parallel to the direction of movement of the mobile body.

The axes of the two optical receivers 5 and 6 are thus separated by a distance "A" which is approximately equal to double the radius of the ferrules, while their mid point is positioned on the origin of the system of Cartesian axes.

The two optical fibers 7 and 8 can, for example, have an diameter of 140μ, a core diameter of 100μ and an acceptance angle of about 15 degrees.

The outputs of the photodiodes 9 and 10 are connected to the inputs of the two amplifiers 11 and 12, and the outputs of the two amplifiers 11 and 12 are connected to the inputs of two analogue/digital converters 13 and 14.

The output of analogue/digital converter 13 is connected to the negative input of a subtractor 15, and to one of the inputs of an adder 16. The output of analogue/digital converter 14 is connected to the positive input of the subtractor 15 and to the other input of the adder 16.

The outputs of the subtractor 15 and of the adder 16 are connected to the inputs of a divider 17 the output of which is connected to an input of a comparator 18.

The other input of the comparator 18 is connected to a memory device 19 while the output of comparator 18 is connected to the input of an indicating instrument 20.

The photodiodes 9 and 10, the amplifiers 11 and 12, the analogue/digital converters 13 and 14, the subtractor 15, the adder 16, the divider 17, the comparator 18, the memory 19 and the indicating instrument 20 are all of known types and, therefore, are not described in detail.

In an alternative embodiment the subtractor 15 and the adder 16 are omitted from the sensor as just described, and the outputs from the two analogue/digital converters 13 and 14 are connected directly to the two inputs of the divider 17.

The operation of the optical sensor of the present invention can be explained by using the simplified embodiment.

Before beginning said description, however, it must be remembered that in the particular embodiment described above, the laser diode 2 has been positioned on the mobile body 1 so that its maximum angle of divergency, of about 27 degrees, coincides with the direction of movement of mobile body 1. However, it can also be positioned differently as will be later explained. The laser diode 2 itself emits, in the same direction, optical radiation the intensity of which varies according to a Gaussian curve, that is to say, a continuously variable intensity of optical radiation. The optical receivers 5 and 6 are directly facing the laser diode 2 without any device being interposed. The receiving surfaces of the receivers are completely illuminated by the laser diode 2. The receivers are placed side-by-side in the direction of movement of the mobile body. At the initial position of rest of the mobile body 1, the receivers are symmetrically placed straddling the axis of the beam of optical radiation emitted by the laser diode 2.

In these conditions, when the relative positions of the laser diode 2 and the optical receivers 5 and 6 are varied, corresponding to a change in the position of the mobile body 1 relative to that of the fixed reference body 4, the optical receivers 5 and 6 receive optical radiation the intensity of which varies according to a Gaussian curve.

The optical radiation of two intensities $i_1$ and $i_2$ is conveyed by the optical fibers 7 and 8 to the photodiodes 9 and 10 which transform them into electrical signals of intensities $I_1$, $I_2$ corresponding to the intensities of optical radiation received by the optical receivers 5 and 6 and, therefore, such signals will also vary in a Gaussian manner.

The electrical signals $I_1$ and $I_2$ are then amplified by the amplifiers 11 and 12 and digitalized by analogue/digital converters 13 and 14.

The divider 17 then produces an output signal corresponding to the ratio between the digital electrical signals $I_2$ and $I_1$, producing as its output a signal of value $I = I_2/I_1$.

This signal is compared, by means of the comparator 18, with the contents of the memory device 19, and the result of this comparison is visually indicated on the indicating instrument 20.

Alternatively, the signal from the comparator 18 can be sent into other electronic circuits for further processing, such as, for example, in a circuit for controlling the position of the mobile body 1.

A scale of the relationship between each value of the electrical signal I obtained from the ratio between signals $I_2$ and $I_1$, and the corresponding position of the moving body is stored in the memory device 19, as will be explained hereinafter.

Bearing in mind that a variation of the intensity of the optical radiation emitted by the laser diode 2 by a certain factor "a" (for instance, a decrease of 5%) has the effect that each point of the Gaussian curve varies its radiation intensity by exactly the same factor "a" (i.e.

each point of the Gaussian curve in the example shows an intensity of radiation reduced by 5%); and that the electrical signals corresponding to the intensity of the light radiation are subject to variation of the same factor "a" (a reduction of 5% in the example), it will be apparent that an electrical signal corresponding to the ratio of electrical signals both of which were varied by the same factor "a" is independent of such variation.

Therefore, the electrical signal I obtained from the ratio between the electrical signals $I_2$ and $I_1$, is independent of other spurious variations in the intensity of optical radiation from the source, and its value depends uniquely on the position of the receivers relative to the source.

It follows from these considerations that it is essential to have at least two optical sensors, that they must be completely illuminated by the source of optical radiation and that the measurable distance from the optical sensor must be not more than the diameter of the base of the cone of radiation defined by the laser beam.

The electrical signal I, obtained from the ratio between two electrical signals which vary in a Gaussian manner is not Gaussian, and therefore, to obtain a correct scale of correspondence between the value of the signal I and the position of the mobile body, it is necessary to provide a correction factor which is determined when the sensor is being calibrated.

Thus, it is not the values of a Gaussian curve which are stored in memory 19, but instead are values which include this correction factor in such a way that the comparison carried out by comparator 18 gives the exact position of the mobile body.

In the practical embodiment illustrated, the subtractor 15 and the adder 16 execute the difference between, and the sum of, electrical signals $I_1$ and $I_2$ coming from the analogue/digital converters 13 and 14. In fact, the subtractor 15 performs the subtraction $I_2 - I_1$, and the adder 16 the sum $I_2 + I_1$, and these quantities are then divided the one by the other in the divider 17 so that the output of this last is the electrical signal $I = (I_2 - I_1)/(I_2 + I_1)$.

Since in this case the electrical signals $I_1$ and $I_2$ have been treated differently from the method used in the previous example, the correspondence between value of signal I and the position of the mobile body will be different, and therefore, it will be necessary to apply to the Gaussian values registered in memory 19, a different correction factor, which will also be determined in the initial calibration of the optical sensor.

In the optical sensor as described, it is, of course, possible to use more than two optical receivers provided that they are all placed side-by-side in the direction of movement of the mobile body and that they are completely illuminated by the source of light radiation.

In such a case, the subtractor 15 and the adder 16 would be replaced by more complicated circuits which take two whatsoever combinations of the "n" electrical signals, where "combination" has the meaning already explained the description of the method.

The only restriction on such combinations is that they must be different one from the other.

For example, with three optical receivers the electrical output signal could be obtained from the relationship $I = ((I_2 - I_1)/(I_1 + I_2)) - ((I_3 - I_2)/(I_3 + I_2))$.

Naturally, the correction factor to be applied to the Gaussian values to be recorded in the memory 19 will be different for each combination, and must be determined experimentally during calibration of the optical sensor.

Furthermore, in place of a source whose intensity varies in a Gaussian manner, it is possible to use other types of optical radiation sources the intensity of which varies in a continuous way in the direction of movement of the mobile body.

For dimensioning the optical sensor of the present invention, it should be remembered that, as a source, a Toshiba laser/diode of type TOLD 131 was used as an example, and such a diode emits a laser beam with unequal angles of divergence (specifically a maximum angle of 27 degrees and a minimum angle of 10 degrees). The laser diode has been fixed to the mobile body so that the maximum angle of divergence coincides with the direction of movement of the mobile body, and the optical receivers are the extremities of two optical fibers having an acceptance angle of 15 degrees.

It follows from these considerations that the orientation of the laser diode on the mobile body is not at all critical and that any positions are acceptable provided that the angle of divergence of the laser beam in the direction of movement of the mobile body is sufficient to measure the desired displacement.

Specifically, it would be possible to select laser sources with angles of divergence which are less different one from the other. The ideal case would be to have equal angles of divergence so that the cone of radiation would be circular, in which case the laser diode could be oriented in any direction on the mobile body for it to be able always to measure the same displacement.

For example, it would be possible to use a remote laser diode and send the light radiation emitted by the laser diode along an optical fiber, using the free end of the optical fiber as a source of radiation in the form of a circular cone.

The dimensions of the optical sensor in the particular form of the practical embodiment illustrated were chosen using the following criteria:

The optical fibers 7 and 8 were chosen to have an acceptance angle of 15 degrees, and the fact that both the receivers, or rather the ends of both the optical fibers 7 and 8 must always be completely illuminated, requires the use of a conical laser beam with a half angle of 15 degrees (shown in FIG. 2 by the dash and dot line). However, there is nothing to prevent the use of optical fibers with larger or smaller acceptance angles or laser beams with larger or smaller cone angles.

When the half angle of the cone to be used has been decided, the distance "L" between source and optical receivers can be chosen as a compromise between the need to have a large distance so that the diameter of the base of the cone, (and therefore, the maximum distance which can be measured) is as great as possible, and the necessary condition that the ends of the optical fibers receive sufficient intensity of optical radiation for it to be accurately and reliably measurable.

The second requisite depends mainly on the sensitivity of the photodiodes and the electronic circuits used.

Accepting the above choices and using a Toshiba Type TOLD 131 diode laser, the preferred value for "L" is 7.5 mm, but any value between 5 and 10 mm is acceptable, and it is evident that by employing other sources of optical radiation, it would be possible to use a different distance for "L".

Since the maximum measurable distance is given by the diameter "D" of the base of the cone of the laser beam less the distance "A" between the ends of the optical fibers and to have the measurable distance as great as possible, the optical fibers should be as close together as possible.

However, the ends of the two optical fibers must also receive radiation intensities which are different and still measurable accurately and reliable, even in the areas where the curve has least slope (for example at the top) so that for this reason the said ends should be as far distant from each other as possible.

In view of these two opposing tendencies, the preferred compromise is to have the distance "A" between the ends of the optical fibers equal to about 1 mm, but distances between 0.5 mm and 1.5 mm are acceptable.

The above description makes it clear that the method and the optical sensor of the present invention achieve the desired purpose of making the determination of the position of the mobile body independent of spurious movements of an encoder position relative to the mobile body and of spurious variations in the intensity of the source of light radiation.

The said purposes have been achieved by eliminating the encoder plate, choosing a particular source of optical radiation, whose intensity varies in a continuous way in the direction of movement of the mobile body, putting the optical receivers directly facing the source without any interposed device, limiting the reciprocal displacement of source and receivers in such a way that the latter are always completely illuminated by the source combination of the electrical signals corresponding to the optical signals picked up by the optical receivers.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. A method for determining the position of a mobile body movable along a rectilinear path and transversely with respect to a fixed reference body comprising the following steps:
    providing one said body with a source of optical radiation having an intensity which varies in a continuous way in the direction of movement of the mobile body;
    providing the other said body with at least two optical receivers aligned side-by-side in the direction of movement of the mobile body;
    aiming the optical receivers directly at the source of optical radiation without any interposed encoding device, and with the optical receiver disposed so that they are completely illuminated by the radiation from said source;
    converting the intensity of the optical radiation detected by each optical receiver into first electrical signal and a second electrical signal of corresponding intensity;
    determining the ratio between at least said first electrical signal and at least said second electrical signal;
    comparing the value of said ratio with predetermined ratio reference values corresponding to the position of the mobile body.

2. A method according to claim 1 wherein said first signal and said second signal are combined in a first manner to provide a first combination of signals, said first signal and said second signal are combined in a second different manner to provide a second combination of signals and the ratio which is determined is the ratio between said first combination of signals and said second combination of signals.

3. A method according to claim 2 in which two optical receivers are provided, the intensities of optical radiation detected by the optical receivers are transformed into said first electrical signal and said second electrical signal, said first combination of signals is obtained by subtracting one of said electrical signals from the other of said electrical signals and said second combination of signals is obtained by adding one of said electrical signals to the other of said electrical signals.

4. A method according to claim 1 in which two optical receivers are provided, the intensities of optical radiation detected by the optical receivers are transformed into a first electrical signal and a second electrical signal, and the ratio which is determined is the ratio of one signal and the other said electrical signal.

5. An optical sensor for determining the position of a mobile body movable along a rectilinear path and transversely with respect to a fixed reference body comprising the combination of:
    a source of optical radiation affixed to one said body and having an intensity which varies in a continuous way in the direction of movement of the mobile body;
    at least two optical receivers affixed to the other said body and aligned side-by-side in the direction of movement of the mobile body, said receivers having radiation receiving surfaces and being disposed with their radiation receiving surfaces facing directly towards the source of optical radiation, without any interposed encoding device and with said surfaces completely illuminated by the radiation from said source;
    means for transforming the intensities of the optical radiation detected by each optical receiver into a first electrical signal and a second electrical signal;
    means connected to said transforming means for providing a signal corresponding to the ratio of at least said first signal to a least said second signal;
    means for comparing the value of said ratio with a predetermined ratio reference values corresponding to the position of the mobile body.

6. An optical sensor according to claim 5 wherein said source of optical radiation is a laser diode the radiation intensity of which varies in the direction of movement of said mobile body according to a Gaussian curve.

7. An optical sensor according to claim 5 wherein said radiation receiving surfaces are the free ends of optical fibers.

8. An optical sensor according to claim 7 wherein said optical fibers have an acceptance angle and said source radiates optical radiation in the shape of a cone and wherein the extent of relative movement between the said source and said free ends of said optical fibers is not greater than the base of a cone having a half angle at its vertex equal to the acceptance angle of said optical fibers.

9. An optical sensor according to claim 8 wherein said acceptance angle of said optical fibers is not greater than 15 degrees.

10. An optical sensor according to claim 5 wherein the distance between said source of optical radiation and said optical receivers, measured along the axis of the direction of propagation of said optical radiation is in the range 5 mm to 10 mm.

11. An optical sensor according to claim 10 wherein said distance is substantially equal to 7.5 mm.

12. An optical sensor according to claim 7 wherein said free ends extend around the axes of said optical fibers and the distance between said axes of said optical fibers at said free ends is between 0.5 mm and 1.5 mm.

13. An optical sensor according to claim 12 wherein said distance between the axes of said free ends is substantially equal to 1 mm.

14. An optical sensor according to claim 7 wherein the radiation intensity of said source varies in the direction of movement of said mobile body according to a Gaussian curve and wherein in the desired position of said mobile body, said free ends of said optical fibers are disposed symmetrically about the axis of said Gaussian curve.

* * * * *

UNITED STATES PATENT AND TRADEMARK OFFICE
CERTIFICATE OF CORRECTION

PATENT NO. : 4,986,663
DATED : January 22, 1991
INVENTOR(S) : Cecchi et al

It is certified that error appears in the above-identified patent and that said Letters Patent is hereby corrected as shown below:

Col. 4, lines 61 and 62, change "$\frac{2x2}{Wx2}$ .e $\frac{2y2}{Wy2}$" to:

$$--\frac{2x^2}{\overline{Wx}^2}.e\ \frac{2y^2}{\overline{Wy}^2} --$$

Col. 5, lines 15 and 16, change "$\frac{2x2}{Wx2}$" to $--\frac{2x^2}{\overline{Wx}^2} --$ Col. 5, line 26, after "optical" insert --radiation, there is a fixed reference body 4 which has two Col. 5, line 31, after "the" insert --axes of the two optical fibers aligned with the base of the--.

Col. 5, line 46, after "an" insert --external--.

Col. 5, line 48, start the paragraph with --The outputs from the two optical fibers 7 and 8 are connected respectively to the inputs of two photodiodes 9 and 10.--

Col. 9, line 29, after "source" insert --and by determining the ratio between a first and a second--

UNITED STATES PATENT AND TRADEMARK OFFICE
CERTIFICATE OF CORRECTION

PATENT NO. : 4,986,663
DATED : January 22, 1991
INVENTOR(S) : Stefano Cecchi, et al.

It is certified that error appears in the above-identified patent and that said Letters Patent is hereby corrected as shown below:

Column 10, line 44, delete "a"

Signed and Sealed this

Seventh Day of July, 1992

Attest:

DOUGLAS B. COMER

*Attesting Officer*       Acting Commissioner of Patents and Trademarks